(12) United States Patent
Takeda et al.

(10) Patent No.: US 9,399,731 B2
(45) Date of Patent: *Jul. 26, 2016

(54) PHOSPHOR, METHOD FOR PRODUCING THE SAME, AND LUMINESCENT DEVICE USING THE SAME

(71) Applicants: Denki Kagaku Kogyo Kabushiki Kaisha, Tokyo (JP); National Institute For Materials Science, Tsukuba-shi, Ibaraki (JP)

(72) Inventors: Go Takeda, Tokyo (JP); Ryo Yoshimatsu, Tokyo (JP); Naoto Hirosaki, Tsukuba (JP)

(73) Assignee: DENKA COMPANY LIMITED, Tokyo (JP)

( * ) Notice: Subject to any disclaimer, the term of this patent is extended or adjusted under 35 U.S.C. 154(b) by 163 days.

This patent is subject to a terminal disclaimer.

(21) Appl. No.: 13/991,860

(22) PCT Filed: Apr. 2, 2013

(86) PCT No.: PCT/JP2013/060109
§ 371 (c)(1),
(2) Date: Jun. 5, 2013

(87) PCT Pub. No.: WO2014/091776
PCT Pub. Date: Jun. 19, 2014

(65) Prior Publication Data
US 2014/0167084 A1    Jun. 19, 2014

(30) Foreign Application Priority Data

Dec. 14, 2012 (JP) ................... 2012-274112

(51) Int. Cl.
| | |
|---|---|
| *C09K 11/77* | (2006.01) |
| *H01L 33/50* | (2010.01) |
| *C09K 11/08* | (2006.01) |
| *H05B 33/14* | (2006.01) |
| *C04B 35/597* | (2006.01) |
| *C04B 35/626* | (2006.01) |

(52) U.S. Cl.
CPC .......... *C09K 11/0883* (2013.01); *C04B 35/597* (2013.01); *C04B 35/6268* (2013.01); *C09K 11/7734* (2013.01); *H05B 33/14* (2013.01); *C04B 2235/3213* (2013.01); *C04B 2235/3215* (2013.01); *C04B 2235/3217* (2013.01); *C04B 2235/3224* (2013.01); *C04B 2235/3418* (2013.01); *C04B 2235/3817* (2013.01); *C04B 2235/3852* (2013.01); *C04B 2235/3865* (2013.01); *C04B 2235/3873* (2013.01); *C04B 2235/3891* (2013.01); *C04B 2235/402* (2013.01); *C04B 2235/428* (2013.01)

(58) Field of Classification Search
CPC .......... C09K 11/7706; C09K 11/7728; C09K 11/7734; C09K 11/7774; C09K 11/7783; C09K 11/0883; H01L 33/005; H01L 33/502; H05B 33/14; C04B 35/597; C04B 35/6268; C04B 2235/766; C04B 2235/767
USPC ................ 252/301.4 F; 313/503; 264/21
See application file for complete search history.

(56) References Cited

U.S. PATENT DOCUMENTS

| | | | |
|---|---|---|---|
| 2007/0194685 A1 * | 8/2007 | Hirosaki | ............... 313/485 |
| 2013/0207535 A1 * | 8/2013 | Hirosaki et al. | ........ 313/486 |

FOREIGN PATENT DOCUMENTS

| | | |
|---|---|---|
| EP | 2 784 143 A1 | 10/2014 |
| WO | WO 2006/093298 A1 | 9/2006 |
| WO | WO 2007/037059 A1 | 4/2007 |
| WO | WO 2007/105631 A1 | 9/2007 |

OTHER PUBLICATIONS

Extended European Search Report dated Apr. 8, 2015, issued to European Application No. 13727795.0.

* cited by examiner

*Primary Examiner* — Matthew E Hoban
*Assistant Examiner* — Lynne Edmondson
(74) *Attorney, Agent, or Firm* — Stein IP, LLC

(57) ABSTRACT

A blue phosphor having an emission peak wavelength different from that of conventional blue phosphors, a method for producing the same, and a high-intensity luminescent device using the phosphor are provided. The phosphor of the present invention is represented by a general formula $Me_aRe_bAl_cSi_dO_eN_f$ (Me may contain one or more elements selected from Mg, Ca, Sc, Y, and La as second elements, provided that Sr or Ba is contained as an essential first element, and Re may contain one or more elements selected from Mn, Ce, Tb, Yb, and Sm as second elements, provided that Eu is contained as an essential first element), where the composition ratio represented by a, b, c, d, e, and f has the following relations: $a+b=1$, $0.005<b<0.25$, $1.60<c<2.60$, $2.50<d<4.05$, $3.05<e<5.00$, and $2.75<f<4.40$.

16 Claims, 2 Drawing Sheets

PHOSPHOR, METHOD FOR PRODUCING THE SAME, AND LUMINESCENT DEVICE USING THE SAME

CROSS-REFERENCE TO RELATED APPLICATIONS

This application is a national stage application of PCT Application No. PCT/JP2013/060109, filed Apr. 2, 2013, which claims the benefit of Japanese Application No. 2012-274112, filed Dec. 14, 2012, in the Japanese Intellectual Property Office, the disclosures of which are incorporated herein by reference.

JOINT RESEARCH AGREEMENT

The presently claimed invention was made by or on behalf of the below listed parties to a joint research agreement. The joint research agreement was in effect on or before the date the claimed invention was made, and the claimed invention was made as a result of activities undertaken within the scope of the joint research agreement. The parties to the joint research agreement are 1) Denki Kagaku Kogyo Kabushiki Kaisha and 2) National Institute for Materials Science.

BACKGROUND OF THE INVENTION

1. Field of the Invention

The present invention relates to a phosphor having composite oxynitride host crystal, efficiently excited in an ultraviolet to near ultraviolet wavelength region, and emitting high-brightness blue light, a method for producing the same, and a luminescent device using the same.

2. Description of the Related Art

Phosphors emit visible light when being excited by a high-energy excitation source such as vacuum ultraviolet light, ultraviolet light, electron beam, and near ultraviolet light. If phosphors are exposed to an excitation source for a long time, their brightness decreases, which is why a phosphor exhibiting little decrease in brightness even after a long period of use has been required.

To solve the above problem, oxynitride-based phosphors have been proposed, instead of conventional oxide-based phosphors such as silicate, phosphate, and aluminate phosphors, and sulfide-based phosphors (Patent Literatures 1 to 3) because the oxynitride-based materials are high in chemical stability and thus known as heat-resistant structural materials.

CITATION LIST

Patent Literature

Patent Literature 1: WO 2006/093298
Patent Literature 2: WO 2007/037059
Patent Literature 3: WO 2007/105631

SUMMARY OF THE INVENTION

An oxynitride-based phosphor is a solid solution where rare-earth elements such as europium exist in crystal called SiAlON.

While studying the relation between crystalline structure of SiAlON and rare-earth elements, the inventor, et al. found that a high-brightness blue phosphor having an emission peak wavelength different from those of conventional blue phosphors is obtained when the crystalline structure of SiAlON and the rare-earth elements satisfy specific conditions, and thus achieved the present invention.

It's an object of the present invention to provide a blue phosphor having an emission peak wavelength different from those of conventional blue phosphors, a method for producing the same, and a high-intensity luminescent device using the phosphor.

The present invention provides a crystalline phosphor represented by a general formula $Me_a Re_b Al_c Si_d O_e N_f$ (Me contains one or more elements selected from Sr and Ba, and Re contains Eu), where composition ratio represented by a, b, c, d, e, and f have the following relations:

$$a+b=1$$

$$0.005<b<0.25$$

$$1.60<c<2.60$$

$$2.45<d<4.05$$

$$3.05<e<5.00$$

$$2.75<f<4.40$$

It is preferable that c, d, e, and f of the phosphor of the present invention have the following relations: $0.500<c/d<0.720$ and $0.900<e/f<1.570$.

The phosphor of the present invention is excited by light having wavelengths falling within a range from 300 nm to 420 nm, and has an emission peak wavelength falling within a range from 450 nm to 485 nm.

Another invention from a different viewpoint provides a method for producing the phosphor of the present invention, the method including: a mixing process for mixing chemical compounds listed in (1) to (4) below; a baking process for baking the mixture having undergone the mixing process; an annealing process after the baking process; and an acid treatment process after the annealing process:

(1) One or more substances selected from carbonate, oxide, nitride, carbide, hydride, and silicide of elements represented as Me (Me contains one or more elements selected from Sr and Ba);

(2) One or more substances selected from carbonate, oxide, halide, nitride, carbide, hydride, and silicide of elements represent as Re (Re contains Eu);

(3) One or more types of aluminum compounds selected from aluminum oxide, aluminum halide, aluminum nitride, and aluminum metal; and (4) One or more types of silicon compounds selected from silicon nitride, silicon oxide, silicon oxynitride, and silicon metal.

The baking process is preferably performed in an atmospheric gas under one or more atmospheric pressure and under temperature conditions falling within a range from 1400° C. to 1800° C.

The annealing process is preferably performed at temperatures falling within a range from 1200° C. to 1600° C.

With the method for producing the phosphor of the present invention, in addition to substances listed in (1) to (4) above, a phosphor obtained by performing baking in an atmospheric gas under one or more atmospheric pressure and under temperature conditions falling within a range from 1400° C. to 1800° C. may be added.

Yet another invention from a different viewpoint provides a luminescent device including a light-emitting device and the phosphor of the present invention.

In the luminescent device of the present invention, it is desirable that one or more types of phosphors having emission peak wavelengths longer than that of the phosphor of the present invention be further provided.

As the light-emitting device, either an inorganic or organic device emitting light having wavelengths falling within a range from 340 nm to 450 nm is preferably adopted.

It is preferable that the light-emitting device is an LED.

The luminescent device is preferably a backlight for liquid crystal TVs, light source device for projectors, lighting unit, or signaling device.

Since the emission peak wavelength of the phosphor of the present invention has shifted to longer wavelength side than the emission peak wavelength of conventional blue phosphors, a wide emission bandwidth containing a high-visibility wavelength region is ensured, and consequently brighter blue light can be obtained. By the method for generating the phosphor according to the invention viewed from a different perspective, a phosphor emitting blue light higher in brightness than the conventional phosphors can be produced. According to the invention viewed from yet another perspective, a luminescent device having a phosphor emitting blue light higher in brightness can be provided.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Figure 1:
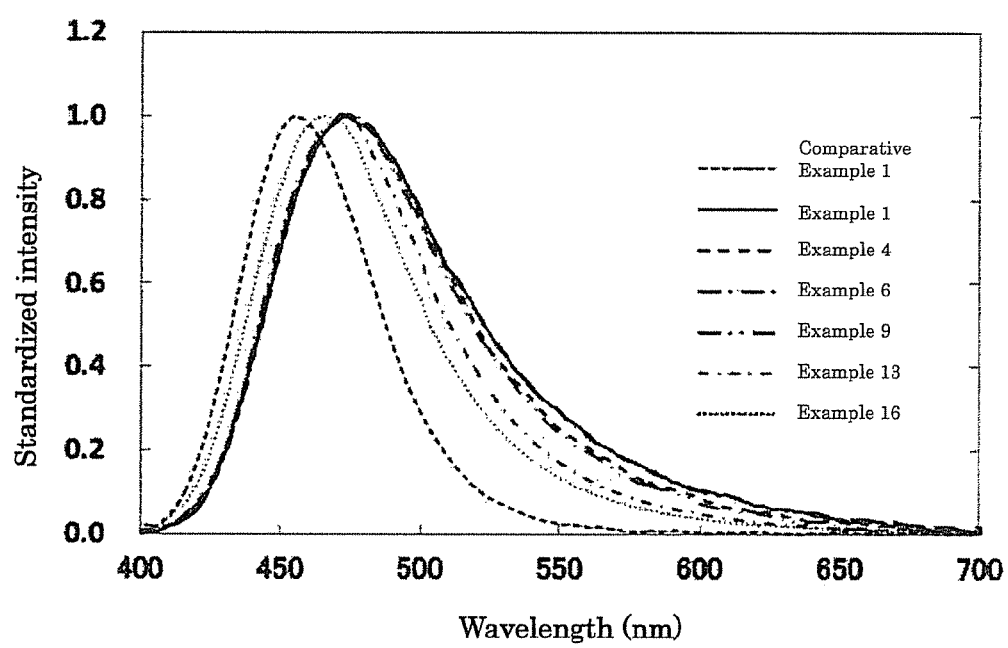
FIG. 1 is a chart exhibiting emission spectra of the phosphors of Comparative Example 1 and Examples 1, 4, 6, 9, 13, and 16 of the present invention.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

The present invention provides a crystalline phosphor represented by a general formula $Me_aRe_bAl_cSi_dO_eN_f$ (Me contains one or more elements selected from Sr and Ba, and Re contains Eu), where composition ratio represented by a, b, c, d, e, and f has the following relations:

$a+b=1$ $0.005<b<0.25$ $1.60<c<2.60$ $2.45<d<4.05$ $3.05<e<5.00$ $2.75<f<4.40$

As described above, Me contains one or more elements selected from Sr and Ba and it is preferable to select only Ba. When both Sr and Ba are contained, it is preferable that Ba is more contained. It is because Ba allows more stable crystal structure and more efficient light emitting.

Also, Me may further contain one or more elements selected from Mg, Ca Sc, Y, and La other than Sr and Ba.

Re element may further contain one or more elements selected from Mn, Ce Tb, Yb, and Sm other than Eu. Ce or Yb is preferable other than Eu.

The composition ratio represented by a to f is the molar ratio of elements, and the element ratio obtained by multiplying a to f by an arbitrary positive number is interpreted as the same composition formula. Namely, since the ratio of elements is determined so that a+b=1 is satisfied in the present invention, the scope of the present invention is distinguished from that of a composition formula of a material based on whether values a to f are determined by satisfying a+b=1.

With the phosphor of the present invention, b, which represents the ion concentration of a luminescent element such as Eu represented by Re, falls within the $0.005<b<0.25$ range, preferably within the $0.01<b<0.20$ range, and more preferably within the $0.02<b<0.10$ range. If b is smaller than 0.005, the number of atoms of the luminescent element ions is insufficient, and consequently sufficient luminous efficiency cannot be ensured. Meanwhile, if b exceeds 0.25, the number of atoms of luminescent element ions becomes too large, thus triggering a phenomenon called concentration quenching, which is reabsorption effect of excitation energy by luminous ions arranged adjacent to each other. Consequently, sufficient luminous efficiency cannot be ensured, either.

In the phosphor of the present invention, the ratio of elements of aluminum, silicon, oxygen and nitrogen is represented by c to f, which respectively fall within the following range: $1.60<c<2.60$, $2.45<d<4.05$, $3.05<e<5.00$, $2.75<f<4.40$. The crystalline structure of the phosphor of the present invention remains stable within a range where all the requirements of the composition ratio, a to f, are satisfied. If these numbers become lower than the lower limit, or exceed the upper limit, formation of a second-phase burnt product is promoted during production, or the luminous efficiency of the phosphor produced decreases, which is unfavorable.

More preferably, the composition ratio represented by c to f falls within the following range: $1.83<c<2.20$, $2.73<d<3.50$, $3.28<e<4.90$, and $3.12<f<4.23$.

The composition ratio represented by c to f of the phosphors of the present invention preferably has the following relation: $0.500<c/d<0.720$ and $0.900<e/f<1.570$.

The value c/d, which is the ratio of aluminum to silicon, and e/f, which is the ratio of oxygen to nitrogen, respectively fall within the following range: $0.500<c/d<0.720$ and $0.900<e/f<1.570$, more preferably $0.610<c/d<0.690$ and $1.000<e/f<1.450$, and if $0.620<c/d<0.675$ and $1.007<e/f<1.320$ are satisfied, the crystalline structure becomes more stable, and thus luminous efficiency increases, which is favorable. If c/d and e/f do not fall within the above ranges, the luminous efficiency decreases.

If the composition ratio represented by a to f of the phosphor of the present invention are allowed to fall within the following range: $0.90<a<0.98$, $0.02<b<0.10$, $1.83<c<2.20$, $2.73<d<3.50$, $3.28<e<4.47$, $3.12<f<4.04$, $0.620<c/d<0.675$, and $1.007<e/f<1.320$, the crystalline structure becomes more stable and emission peak wavelength remains stable around 470 nm, which is favorable.

It is preferable that the phosphor of the present invention is excited by light having wavelengths that fall within a range from 300 nm to 420 nm, and that its emission peak wavelength exists in a wavelength range from 450 nm to 485 nm, and more preferably in the 469 nm±8 nm range.

The method for producing the phosphor of the present invention includes: a mixing process for mixing chemical compounds listed in (1) to (4) below; a baking process for baking the mixture having undergone the mixing process; an annealing process after the baking process; and an acid treatment process after the annealing process:

(1) One or more substances selected from carbonate, oxide, nitride, carbide, hydride, and silicide of elements represented by Me (Me contains one or more elements selected from Sr and Ba, and may further contain Mg, Ca, Sc, Y, and La);

(2) One or more substances selected from carbonate, oxide, halide, nitride, carbide, hydride, and silicide of elements represented by Re (Re contains Eu, and may further contain one or more elements selected from Mn, Ce, Tb, Yb, and Sm);

(3) One or more types of aluminum compounds selected from aluminum oxide, aluminum halide, aluminum nitride, and aluminum metal; and (4) One or more types of silicon compounds selected from silicon nitride, silicon oxide, silicon oxynitride, and silicon metal.

The proportion of chemical compounds listed in (1) to (4) may be designed based on the composition ratio represented by a to f. Flux may be added to the chemical compounds listed in (1) to (4). As the flux, halide of alkali metal, halide of alkaline earth metal, halide of aluminum, etc. may be used. They may be added to the chemical compounds listed in (1) to (4) at a ratio of 0.01 to 20% by weight.

Me and Re elements are formed as described above.

It is preferable that the baking process is implemented in atmospheric gas under one or more atmospheric pressure and at temperatures falling within a range from 1400° C. to 1800° C., and more preferably within a range from 1500° C. to 1700° C. If the baking temperature is 1400° C. or lower, sufficient reaction does not occur among chemical compounds, and consequently generation of second phase or decrease in crystallinity may result. Meanwhile, if the baking temperature is 1800° C. or higher, the baked body becomes a complete sintered body by the reaction via a liquid phase, and as a result of mechanical crashing that is performed to turn the sintered body to powder, degradation in luminous efficiency and crystallinity results. It is therefore preferable that the baking process is implemented in nitrogen atmosphere under one or more atmospheric pressure.

The highest-temperature retaining time in the baking process is generally one to 20 hours, although it varies depending on the baking temperatures.

It is preferable that the annealing process is implemented at temperatures falling within a range from 1200° C. to 1600° C. The annealing process is performed in an atmosphere of nitrogen, argon, or hydrogen, or in a mixed atmosphere of two or more of those.

As an acidic solution used for the acid treatment process, a hydrochloric acid solution, sulfuric acid solution, or acetic acid solution, a mixed solution of two or more or those, or a solution obtained by diluting the mixed solution with ion-exchange water is used.

The phosphor produced by the producing method described previously may be mixed into the chemical compounds listed in (1) to (4) at a ratio of up to 20% by weight of the raw material mixture.

The luminescent device of the present invention includes a light-emitting device and the phosphor of the present invention. As such a luminescent device, one or more phosphors having emission peak wavelength in a region longer than that of the phosphor of the present invention may be used, in addition to the phosphor of the present invention.

The phosphors having emission peak wavelength in a region longer than that of the phosphor of the present invention are those having an emission peak in wavelength region of 485 nm or longer, and β-SiAlON:Eu, $(Ba, Sr)_2SiO_4$:Eu, Sr—SiAlON:Eu, α-SiAlON:Eu, $(Li, Ca)(Al, Si)_2(N, O)_3$:Ce, $(Ca, Sr, Ba)_2Si_5N_8$:Eu, $SrAlSi_4N_7$:Eu, $(Ca, Sr)AlSiN_3$:Eu, and $La_2O_2S$:Eu may be used, for example.

The light-emitting device is preferably either inorganic or organic light-emitting device ensuring emission of light of 300 nm or longer but not exceeding 420 nm.

The light-emitting device is an LED, for example.

The luminescent device may be a backlight for liquid crystal TVs, light source device for projectors, lighting unit, or signaling device.

The Examples of the present invention will hereinafter be described in detail.

As raw materials of the phosphor, $Si_3N_4$ (silicon nitride), $Al_2O_3$ (aluminum oxide), $SrCO_3$ (strontium carbonate), $BaCO_3$ (barium carbonate), and $Eu_2O_3$ (europium oxide) powder were used. These substances were weighed in order that a prescribed composition ratio in general formula $Me_aRe_bAl_cSi_dO_eN_f$ is obtained, and mixed in dry state in a mortar to obtain powder mixture. As Me, Sr and Ba were used (only Ba is used in Examples 11, 12, and 13, only Sr is used in Example 15), and as Re, Eu only was used.

The obtained powder mixture was placed in a crucible made of BN (boron nitride).

The BN crucible filled with the powder mixture was set in an electric furnace adopting a graphite heating system, with carbon fiber used as an insulator, and baking of the powder mixture was performed. The heating enclosure of the electric furnace was made to be vacuum by using a rotary pump and a diffusion pump, the furnace was then filled with nitrogen gas until one atmospheric pressure was reached, the temperature was increased from room temperature to 1600° C. at the rate of 500° C. per hour, and the temperature was maintained at 1600° C. for four hours.

The sintered body was crashed to obtain phosphor powder.

The luminous efficiency of the phosphor was measured as follows:

Light irradiated from a xenon lamp, namely a light source, was dispersed to have wavelength of 405 nm using a spectrograph to obtain excitation light, the obtained excitation light was irradiated to the phosphor set within an integrating sphere using optical fiber, and the emission of the phosphor due to that excitation light was observed using MCPD-7000 manufactured by Otsuka Electronics Co., Ltd.

The values in Table 1 are relative luminous efficiency measured with the luminous efficiency of the phosphor in Comparative Example 1 (a conventional blue phosphor having an oxide base commonly called BAM. Typical BAM composition is $BaMgAl_{10}O_{17}$:Eu, and the peak wavelength is 455 nm), regarded as 100%. Since the phosphors in Examples 1 to 17 and in Comparative Examples 2 and 3 should be high-brightness phosphors because of the characteristics of the spectra, relative luminous efficiency of 90% or higher is acceptable.

The composition ratio represented by a to f of the phosphors was found based on the analysis values in the Examples. Analysis values by ICP were used for cationic elements in Me, Re, Al and Si, and the analysis values by an oxygen-nitrogen analyzer were used for anionic ions of O and N. Table 1 shows the results obtained.

TABLE 1

| | | | | Composition ratio | | | | | | | |
|---|---|---|---|---|---|---|---|---|---|---|---|
| | | Me | Re | a | b | c | d | e | f | c/d | e/f | RLE %* |
| Com. Ex. | 1 | | | Commercially available phosphor | | | | | | | | 100% |
| Com. Ex. | 2 | Sr, Ba | Eu | 0.92 | 0.08 | 1.58 | 2.42 | 3.61 | 2.57 | 0.653 | 1.405 | 31% |
| Com. Ex. | 3 | Sr, Ba | Eu | 0.92 | 0.08 | 2.72 | 4.09 | 5.01 | 4.59 | 0.665 | 1.092 | 74% |
| Ex. | 1 | Sr, Ba | Eu | 0.93 | 0.07 | 2.14 | 3.25 | 4.47 | 3.40 | 0.657 | 1.317 | 92% |
| Ex. | 2 | Sr, Ba | Eu | 0.92 | 0.08 | 2.13 | 3.23 | 4.38 | 3.32 | 0.662 | 1.320 | 97% |
| Ex. | 3 | Sr, Ba | Eu | 0.93 | 0.07 | 2.13 | 3.23 | 4.41 | 3.43 | 0.660 | 1.288 | 100% |
| Ex. | 4 | Sr, Ba | Eu | 0.93 | 0.07 | 2.11 | 3.24 | 4.28 | 3.32 | 0.650 | 1.289 | 107% |
| Ex. | 5 | Sr, Ba | Eu | 0.92 | 0.08 | 2.19 | 3.26 | 4.42 | 3.39 | 0.673 | 1.303 | 108% |
| Ex. | 6 | Sr, Ba | Eu | 0.93 | 0.07 | 2.14 | 3.28 | 4.19 | 3.57 | 0.651 | 1.174 | 99% |
| Ex. | 7 | Sr, Ba | Eu | 0.93 | 0.07 | 2.19 | 3.35 | 4.26 | 3.62 | 0.653 | 1.177 | 105% |
| Ex. | 8 | Sr, Ba | Eu | 0.93 | 0.07 | 2.17 | 3.50 | 4.07 | 4.04 | 0.620 | 1.007 | 111% |
| Ex. | 9 | Sr, Ba | Eu | 0.93 | 0.07 | 2.20 | 3.46 | 4.31 | 3.76 | 0.636 | 1.147 | 115% |
| Ex. | 10 | Sr, Ba | Eu | 0.92 | 0.08 | 2.19 | 3.28 | 4.37 | 3.60 | 0.669 | 1.212 | 112% |
| Ex. | 11 | Ba | Eu | 0.93 | 0.07 | 1.84 | 2.73 | 3.49 | 3.17 | 0.674 | 1.103 | 97% |
| Ex. | 12 | Ba | Eu | 0.93 | 0.07 | 1.83 | 2.75 | 3.28 | 3.12 | 0.666 | 1.054 | 112% |
| Ex. | 13 | Ba | Eu | 0.93 | 0.07 | 1.86 | 2.81 | 3.32 | 3.13 | 0.662 | 1.059 | 119% |
| Ex. | 14 | Sr, Ba | Eu | 0.93 | 0.07 | 2.06 | 3.94 | 3.92 | 4.23 | 0.522 | 0.926 | 91% |
| Ex. | 15 | Sr | Eu | 0.92 | 0.08 | 2.09 | 3.03 | 4.31 | 3.32 | 0.689 | 1.298 | 93% |
| Ex. | 16 | Sr, Ba | Eu | 0.98 | 0.02 | 1.90 | 2.90 | 3.66 | 3.18 | 0.654 | 1.152 | 90% |
| Ex. | 17 | Sr, Ba | Eu | 0.90 | 0.10 | 2.15 | 3.09 | 4.90 | 3.16 | 0.696 | 1.548 | 92% |

*Relative luminous efficiency

The phosphor in Example 1 was $(Sr,Ba)_{0.93}Eu_{0.07}Al_{2.14}Si_{3.25}O_{4.47}N_{3.40}$. The composition ratio (molar ratio) of Sr and Ba was Sr:Ba=1.00:1.25. When the luminous efficiency of the commercially available phosphor in Comparative Example 1 was regarded as 100%, the relative luminous efficiency rate of the phosphor in Example 1 was 92%, which was higher than the passing score. The emission peak wavelength of the phosphor in Example 1 fell within the 469 nm±8 nm range, although the value is not shown in Table 1.

The phosphor in Example 2 was obtained by subjecting the phosphor powder in Example 1 to annealing in nitrogen atmosphere (atmospheric pressure) at 1200° C. for eight hours. The relative luminous efficiency of the phosphor in Example 2 was 97%, and its emission peak wavelength fell within the 469 nm±8 nm range, although the value is not shown in Table 1. The relative luminous efficiency has improved by annealing.

The phosphor in Example 3 was obtained by subjecting the phosphor powder in Example 1 to annealing in nitrogen atmosphere (atmospheric pressure) at 1300° C. for eight hours. The relative luminous efficiency of the phosphor in Example 3 was 100%, and its emission peak wavelength fell within the 469 nm±8 nm range, although the value is not shown in Table 1. The relative luminous efficiency has further improved by changing the annealing conditions.

The phosphor in Example 4 was obtained by subjecting the phosphor powder in Example 1 to annealing in nitrogen atmosphere (atmospheric pressure) at 1400° C. for eight hours. The relative luminous efficiency of the phosphor in Example 4 was 107%, and its emission peak wavelength fell within the 469 nm±8 nm range, although the value is not shown in Table 1. The relative luminous efficiency has further improved by changing the annealing conditions.

The phosphor in Example 5 was obtained by subjecting the phosphor powder in Example 1 to annealing in nitrogen atmosphere (atmospheric pressure) at 1500° C. for eight hours. The relative luminous efficiency of the phosphor in Example 5 was 108%, and its emission peak wavelength fell within the 469 nm±8 nm range, although the value is not shown in Table 1. The relative luminous efficiency has further improved by changing the annealing conditions.

The phosphor in Example 6 was obtained by subjecting the phosphor powder in Example 1 to acid treatment. In the acid treatment process in this Example, the phosphor powder produced in Example 1 was immersed in an acidic solution (liquid temperature: 30° C.) obtained by diluting nitric acid with ion-exchange water for 30 to 60 minutes. The nitric acid was diluted at volume ratio of 12%. The relative luminous efficiency of the phosphor in Example 6 was 99%, and its emission peak wavelength fell within the 469 nm±8 nm range, although the value is not shown in Table 1. The relative luminous efficiency has improved by acid treatment. The same occurred in Examples 7, 10, and 13, which will be described later.

The phosphor in Example 7 was obtained by subjecting the phosphor powder in Example 2 to the same acid treatment process as Example 6. The relative luminous efficiency of the phosphor in Example 7 was 105%, and its emission peak wavelength fell within the 469 nm±8 nm range, although the value is not shown in Table 1.

The phosphor in Example 8 was obtained by subjecting the phosphor powder in Example 3 to the same acid treatment process as Example 6. The relative luminous efficiency of the phosphor in Example 8 was 111%, and its emission peak wavelength fell within the 469 nm±8 nm range, although the value is not shown in Table 1.

The phosphor in Example 9 was obtained by subjecting the phosphor powder in Example 4 to the same acid treatment process as Example 6. The relative luminous efficiency of the phosphor in Example 9 was 115%, and its emission peak wavelength fell within the 469 nm±8 nm range, although the value is not shown in Table 1.

The phosphor in Example 10 was obtained by subjecting the phosphor powder in Example 5 to the same acid treatment process as Example 6. The relative luminous efficiency of the phosphor in Example 10 was 112%, and its emission peak wavelength fell within the 469 nm±8 nm range, although the value is not shown in Table 1.

The phosphor in Example 11, produced by the method same as Example 1 except that only Ba was selected as Me, was $Ba_{0.93}Eu_{0.07}Al_{1.84}Si_{2.73}O_{3.49}N_{3.17}$. The relative luminous efficiency of the phosphor in Example 11 was 97%, and its emission peak wavelength fell within the 469 nm±8 nm range, although the value is not shown in Table 1.

The phosphor in Example 12 was obtained by subjecting the phosphor powder in Example 11 to annealing in nitrogen atmosphere (atmospheric pressure) at 1400° C. for eight hours. The relative luminous efficiency of the phosphor in Example 4 was 112%, and its emission peak wavelength fell within the 469 nm±8 nm range, although the value is not shown in Table 1. The relative luminous efficiency has improved by annealing.

The phosphor in Example 13 was obtained by subjecting the phosphor powder in Example 12 to the same acid treatment process as Example 6. The relative luminous efficiency of the phosphor in Example 13 was 119%, highest score among the Examples, and its emission peak wavelength fell within the 469 nm±8 nm range, although the value is not shown in Table 1.

The phosphor in Example 14 was $(Sr, Ba)_{0.93}Eu_{0.07}Al_{2.06}Si_{3.94}O_{3.92}N_{4.23}$. The composition ratio of Sr and Ba was Sr:Ba=1.00:1.41. The relative luminous efficiency of the phosphor in Example 14 was 91%, and its emission peak wavelength fell within the 469 nm±8 nm range, although the value is not shown in Table 1.

The phosphor in Example 15, produced by the method same as Example 1 except that only Sr was selected as Me, was $Sr_{0.92}Eu_{0.08}Al_{2.09}Si_{3.03}O_{4.31}N_{3.32}$. The relative luminous efficiency of the phosphor in Example 11 was 93%, and its emission peak wavelength fell within the 469 nm±8 nm range, although the value is not shown in Table 1.

The phosphor in Example 16 was $(Sr, Ba)_{0.98}Eu_{0.02}Al_{1.90}Si_{2.90}O_{3.66}N_{3.18}$. The composition ratio of Sr and Ba was Sr:Ba=1.00:1.19. The relative luminous efficiency of the phosphor in Example 16 was 90%, and its emission peak wavelength fell within the 469 nm±8 nm range, although the value is not shown in Table 1.

The phosphor in Example 17 was $(Sr, Ba)_{0.90}Eu_{0.10}Al_{2.15}Si_{3.09}O_{4.90}N_{3.16}$. The composition ratio of Sr and Ba was Sr:Ba=1.00:1.14. The relative luminous efficiency of the phosphor in Example 17 was 92%, and its emission peak wavelength fell within the 469 nm±8 nm range, although the value is not shown in Table 1.

The phosphor in Comparative Example 2 was $(Sr, Ba)_{0.92}Eu_{0.08}Al_{1.58}Si_{2.42}O_{3.61}N_{2.57}$, and the composition ratio of Al, Si, and N represented by c, d, and f did not fall within the range of ratio of the present invention. The relative luminous efficiency of the phosphor in Comparative Example 2 was 31%, lower than the passing score.

The phosphor in Comparative Example 3 was $(Sr, Ba)_{0.92}Eu_{0.08}Al_{2.72}Si_{4.09}O_{5.01}N_{4.59}$, and the composition ratio of Al, Si, O, and N represented by c, d, e, and f were not included in the range of ratio of the present invention. The relative luminous efficiency of the phosphor in Comparative Example 3 was 74%, lower than the passing score.

Since the emission peak wavelengths of the phosphors in Examples 1 to 17 have shifted to the side of longer wavelengths than the emission peak wavelength of the blue phosphor in Comparative Example 1, brighter blue color was obtained.

The relative luminous efficiency values of the phosphors in Examples 1 to 17 were higher than the passing score, whereas those of the phosphors in Comparative Examples 2 and 3, where the requirements of composition ratio represented by a to f, in particular by c to f were not satisfied, were lower than the passing score.

Table 2 lists the producing conditions of the phosphors in Examples.

TABLE 2

|  |  | Baking Temp. ° C. | Retaining time hours | Annealing | Acid treatment |
|---|---|---|---|---|---|
| Com. Ex. | 1 | Commercially available phosphor | | | |
| Com. Ex. | 2 | 1600 | 4 | Without | Without |
| Com. Ex. | 3 | 1600 | 4 | Without | Without |
| Ex. | 1 | 1600 | 4 | Without | Without |
| Ex. | 2 | 1600 | 4 | With | Without |
| Ex. | 3 | 1600 | 4 | With | Without |
| Ex. | 4 | 1600 | 4 | With | Without |
| Ex. | 5 | 1600 | 4 | With | Without |
| Ex. | 6 | 1600 | 4 | Without | With |
| Ex. | 7 | 1600 | 4 | With | With |
| Ex. | 8 | 1600 | 4 | With | With |
| Ex. | 9 | 1600 | 4 | With | With |
| Ex. | 10 | 1600 | 4 | With | With |
| Ex | 11 | 1600 | 4 | Without | Without |
| Ex | 12 | 1600 | 4 | With | Without |
| Ex | 13 | 1600 | 4 | With | With |
| Ex | 14 | 1600 | 4 | Without | Without |
| Ex | 15 | 1600 | 4 | Without | Without |
| Ex | 16 | 1600 | 4 | Without | Without |
| Ex | 17 | 1600 | 4 | Without | Without |

Figure 2:
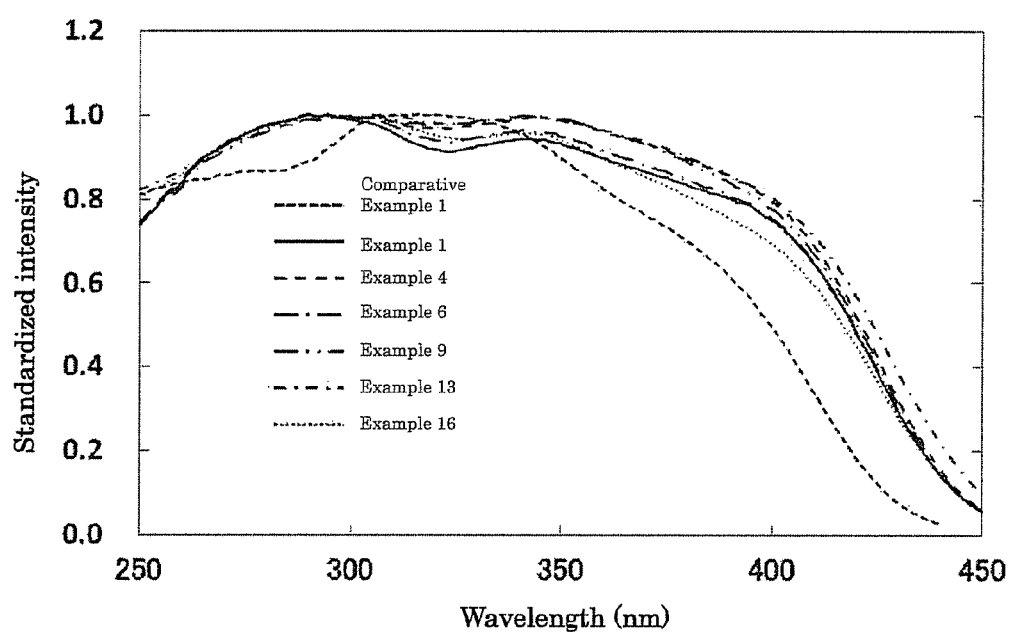
FIG. 2 is a chart exhibiting excitation spectra of the phosphors of Comparative Example 1 and Examples 1, 4, 6, 9, 13, and 16 of the present invention.

FIG. 1 is a chart showing the emission spectra of the phosphors in Comparative Example 1 and Examples 1 4, 6, 9, 13 and 16 of the present invention. FIG. 2 is a chart showing the measurement results of excitation spectra of the phosphors in Comparative Examples 1 and Examples 1, 4, 6, 9, 13 and 16 of the present invention.

The vertical axis in FIG. 1 represents the intensity standardized so that the peak value of the emission spectrum of the phosphors in Comparative Example 1 and Examples 1, 4, 6, 9, 13, and 16 becomes 1. The emission peak wavelengths of the phosphors of the present invention are on the side of longer wavelengths than that of the commercially available phosphor in Comparative Example 1. Specifically, the emission peak wavelength of the phosphor in Comparative Example 1 was 456 nm, whereas that of the phosphors in Examples 1, 4, 6, 9, 13, and 16 were 469 nm±8 nm.

Since the phosphors of the present invention had wider emission bandwidth than the phosphor in Comparative Example 1, and contained much visible light in a wavelength region ensuring high visibility, relatively intense emission was ensured.

The vertical axis of FIG. 2 represents the intensity standardized so that the peak value of the excitation spectrum of the phosphors in Comparative Example 1 and Examples 1, 4, 6, 9, 13, and 16 becomes 1. The phosphors of the present invention were found to exhibit mostly even excitation intensity within the wavelength region from 250 nm to around 430 nm. Unlike the phosphor in Comparative Example 1, it was possible to excite the phosphors in Example 1, 4, 6, 9, 13, and 16 of the present invention efficiently by the light in near ultraviolet region of 380 nm to 420 nm. As these results exhibited, it is found that the phosphors of the present invention emitted light efficiently by a near ultraviolet LED.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A phosphor represented by a general formula $Me_aRe_bAl_cSi_dO_eN_f$ (Me contains one or more elements selected from Sr and Ba, and Re contains Eu),
   wherein the composition ratio represented by a, b, c, d, e, and f has the following relations:

$a+b=1$, $0.005<b<0.25$, $1.60<c<2.60$, $2.45<d<4.05$, $3.05<e<5.00$, and $2.75<f<4.40$:

wherein the ratio of c/d and e/f have the following relationships:

$0.610<c/d<0.690, 1.00<e/f<1.450$, or $0.620<c/d<0.675, 1.007<e/f<1.320$, and wherein the phosphor is excited by light having wavelengths falling within a range from 300 nm to 420 nm, and has an emission peak wavelength in a wavelength range from 450 nm to 485 nm.

2. A method for producing the phosphor as set forth in claim 1, comprising: a mixing process for mixing chemical compounds listed in (1) to (4) below; a baking process for baking the mixture having undergone the mixing process; an annealing process after the baking process; and an acid treatment process after the annealing process:
   (1) One or more substances selected from carbonate, oxide, nitride, carbide, hydride, and silicide of elements represented by Me (Me contains one or more elements selected from Sr and Ba);
   (2) One or more substances selected from carbonate, oxide, halide, nitride, carbide, hydride, and silicide of elements represented by Re (Re contains Eu);
   (3) One or more types of aluminum compounds selected from aluminum oxide, aluminum halide, aluminum nitride, and aluminum metal; and
   (4) One or more types of silicon compounds selected from silicon nitride, silicon oxide, silicon oxynitride, and silicon metal.

3. The method for producing the phosphor as set forth in claim 2, wherein the baking process is performed in an atmospheric gas under one or more atmospheric pressure and at temperatures falling within a range from 1400° C. to 1800° C.

4. The method for producing the phosphor as set forth in claim 2, wherein the annealing process is performed at temperatures falling within a range from 1200° C. to 1600° C.

5. The method for producing the phosphor as set forth in claim 2, comprising:
   a mixing process for mixing chemical compounds listed in (1) to (4) below and the phosphor obtained in claim 4;
   a baking process for baking the mixture having undergone the mixing process;
   an annealing process after the baking process; and
   an acid treatment process after the annealing process:
   (1) One or more substances selected from carbonate, oxide, nitride, carbide, hydride, and silicide of elements represented by Me (Me contains one or more elements selected from Sr and Ba);
   (2) One or more substances selected from carbonate, oxide, halide, nitride, carbide, hydride, and silicide of elements represented by Re (Re contains Eu);
   (3) One or more types of aluminum compounds selected from aluminum oxide, aluminum halide, aluminum nitride, and aluminum metal; and
   (4) One or more types of silicon compounds selected from silicon nitride, silicon oxide, silicon oxynitride, and silicon metal.

6. A luminescent device, comprising: a light-emitting device; and the phosphor as set forth in claim 1.

7. A luminescent device, comprising: a light-emitting device, the phosphor as set forth in claim 1; and one or more types of phosphors having emission peak wavelengths longer than that of the phosphor as set forth in claim 1.

8. The luminescent device as set forth in claim 6, wherein the light-emitting device is either inorganic or organic light-emitting device emitting light having wavelengths falling within a range from 340 nm to 450 nm.

9. The luminescent device as set forth in claim 6, wherein the light-emitting device is an LED.

10. The luminescent device as set forth in claim 6, wherein the luminescent device is a backlight for liquid crystal TVs, light source device for projectors, lighting unit, or signaling device.

11. The method for producing the phosphor as set forth in claim 3, wherein the annealing process is performed at temperatures falling within a range from 1200° C. to 1600° C.

12. The method for producing the phosphor as set forth in claim 2, wherein the annealing process is performed in an atmosphere of nitrogen, argon, or hydrogen, or in a mixed atmosphere of two or more of those.

13. The method for producing the phosphor as set forth in claim 2, wherein an acidic solution is used for the acid treatment process; a hydrochloric acid solution, sulfuric acid solution, or acetic acid solution, a mixed solution of two or more or those, or a solution obtained by diluting the mixed solution with ion-exchange water.

14. The method for producing the phosphor as set forth in claim 5, wherein the annealing process is performed in an atmosphere of nitrogen, argon, or hydrogen, or in a mixed atmosphere of two or more of those.

15. The method for producing the phosphor as set forth in claim 5, wherein an acidic solution is used for the acid treatment process; a hydrochloric acid solution, sulfuric acid solution, or acetic acid solution, a mixed solution of two or more or those, or a solution obtained by diluting the mixed solution with ion-exchange water.

16. The method for producing the phosphor as set forth in claim 5, wherein the phosphor obtained in claim 4 is mixed into the chemical compounds listed in (1) to (4) at a ratio of up to 20% by weight.

* * * * *